United States Patent [19]

Perry

[11] 3,948,855

[45] Apr. 6, 1976

[54] PROCESS FOR REACTING A PHENOL WITH A VICINAL EPOXY COMPOUND IN THE PRESENCE OF PHOSPHORUS OR CARBON CONTAINING ACID, ESTER OR ACID ESTER

[75] Inventor: William O. Perry, Lake Jackson, Tex.

[73] Assignee: The Dow Chemical Company, Midland, Mich.

[22] Filed: June 21, 1973

[21] Appl. No.: 372,364

Related U.S. Application Data

[63] Continuation-in-part of Ser. No. 181,191, Sept. 16, 1971, abandoned, which is a continuation-in-part of Ser. No. 41,618, May 28, 1970, abandoned.

[52] U.S. Cl............ 260/47 EP; 252/182; 260/2 EP; 260/18 PF; 260/49; 260/57 C; 260/78.4 EP; 260/613 B; 260/830 R; 260/830 TW
[51] Int. Cl.$^2$.......................................... C08G 30/04
[58] Field of Search .. 260/47 EP, 2 EP, 149, 613 B, 260/57, 606.5 F, 541; 252/431 P, 437, 2 P, 45.7 P, 18 PF, 78.4 EP

[56] References Cited

UNITED STATES PATENTS

| 2,916,473 | 12/1959 | Bullock et al............................ 260/47 |
| 3,341,580 | 9/1967 | Hechenbleikner.................. 260/541 |
| 3,377,406 | 4/1968 | Newey et al......................... 260/837 |
| 3,412,046 | 11/1968 | Payne ..................................... 260/2 |
| 3,477,990 | 11/1969 | Dante et al. ........................... 260/47 |
| 3,547,885 | 12/1970 | Dante et al. ........................... 260/47 |

OTHER PUBLICATIONS

Chem. Abst. Vol. 55 1961 (p4945e).

*Primary Examiner*—Donald E. Czaja
*Assistant Examiner*—T. Pertilla
*Attorney, Agent, or Firm*—James G. Carter

[57] ABSTRACT

A process for the preparation of phenolic hydroxy ethers whereby an aromatic hydroxyl-containing compound is reacted with a vicinal epoxy-containing compound in the presence of a phosphonium salt of an acid, ester or acid ester of an element selected from carbon or phosphorus, and to precatalyzed epoxy resin compositions comprising an epoxy resin and a catalyst as defined above.

20 Claims, No Drawings

PROCESS FOR REACTING A PHENOL WITH A VICINAL EPOXY COMPOUND IN THE PRESENCE OF PHOSPHORUS OR CARBON CONTAINING ACID, ESTER OR ACID ESTER

This is a continuation-in-part of my copending application Ser. No. 181,191, filed Sept. 16, 1971, now abandoned which is a continuation-in-part of application Ser. No. 41,618 filed May 28, 1970, now abandoned.

This invention relates to a process for the preparation of phenolic hydroxy ethers which comprises reacting an aromatic hydroxyl-containing compound with a vicinal-epoxy-containing compound in the presence of a phosphonium salt of an acid, acid ester or ester of an element selected from the group consisting of carbon, and phosphorus which may be represented by the general formula

wherein $R_1$, $R_2$, $R_2$ and $R_4$ are independently selected from the group consisting of aliphatic hydrocarbon radicals containing from about 1 to about 20 carbon atoms, aromatic hydrocarbon radicals, alkyl substituted aromatic hydrocarbon radicals and radicals represented by the formula $-R_5-Y$ wherein $R_5$ is an aliphatic hydrocarbon radical having from about 1 to about 20 carbon atoms and Y is a member selected from the group consisting of Cl, Br, I, and $NO_2$, and wherein X is the anion portion of an acid, ester or acid ester of an element selected from carbon and phosphorus and wherein m is the valence of the anion X.

This invention also relates to precatalyzed epoxy resin compositions comprising an epoxy resin having an average of more than 1 epoxide group per molecule and a catalyst for promoting the reaction between the epoxide and a hydroxyl group, said catalyst being as defined above.

It is well known in the art to produce hydroxyl-containing ethers by reacting a vicinal epoxy-containing compound with a phenolic hydroxyl-containing compound in the presence of such catalysts as tertiary amines, quaternary ammonium halides, and phosphonium halides and the like.

The process of the present invention not only provides to the art a novel catalyst system for promoting the reaction between a phenolic hydroxyl-containing compound and a vicinal epoxy-containing compound, but provides certain valuable improvements in the products produced by employing such catalyst systems. Among the improvements provided by this invention are less color in the reaction product of the phenolic hydroxyl-containing compound with the vicinal epoxy-containing compound and/or improved electrical properties of cured products when subjected to conditions of humidity when employing a catalyst wherein the anion represented by X is phosphorus. An additional and important advantage of the present process is observed when reacting a dihydric phenol such as a bisphenol or a dihydroxy benzene with a diepoxide to produce high molecular weight resins in that products obtained when the catalysts of the present invention, wherein the anion X is carbon, are employed are much higher in molecular weight, as determined by gel permeation chromatography, than the products produced when the phosphonium halide catalysts of the known art are employed.

The process of the invention involves the reaction of poly epoxy compounds and compounds having more than one phenolic hydroxy group to form the desired phenolic hydroxy ether.

The polyepoxides used in the process of the invention comprise those compounds possessing more than one 1,2-epoxide group. These polyepoxides may be saturated or unsaturated, aliphatic, cycloaliphatic, aromatic or heterocyclic and may be substituted if desired with non-interfering substituents, such as halogen atoms, phosphorus atoms, hydroxyl groups, ether radicals, and the like. They may also be monomeric or polymeric.

For clarity, many of the polyepoxides and particularly those of the polymeric type are described in terms of epoxy equivalent values. The meaning of this expression is described in U.S. Pat. No. 2,633,458. The polyepoxides used in the present process are those having an epoxy equivalency greater than 1.0.

Various examples of polyepoxides that may be used in the invention are given in U.S. Pat. No. 2,633,458 and it is to be understood that so much of the disclosure of that patent relative to examples of polyepoxides is incorporated by reference into this specification.

Other examples include the glycidyl ethers of novolac resins, i.e., phenol-aldehyde condensates. Preferred resins of this type are those of the formula:

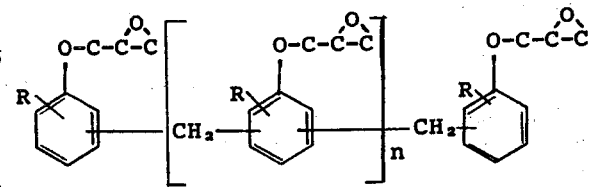

wherein R is hydrogen or an alkyl radical and n has an average value of from about 0.1 to about 10, preferably from about 1 to about 2. Preparation of these polyepoxides is illustrated in U.S. Pat. No. 2,2616,099 and U.S. Pat. No. 2,658,885.

The preferred polyepoxides are those represented by the general formula:

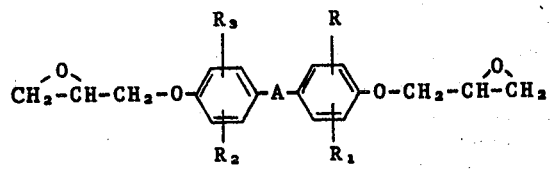

wherein R, $R_1$, $R_2$ and $R_3$ are independently selected from hydrogen, bromine and chlorine and wherein A is an alkylene or alkylidine group having from about 1 to about 4 carbon atoms,

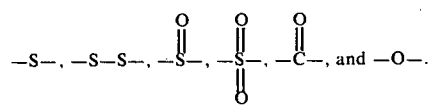

Other examples include the epoxidized esters of the polyethylenically unsaturated monocarboxylic acids, such as epoxidized linseed, soybean, perilla, oiticica, tung, walnut and dehydrated castor oil, methyl linoleate, butyl linoleate, ethyl 9,12-octadecandienoate, butyl 9,12,15-octadecatrienoate, butyl oleostearate, mono or diglycerides of tung oil, monoglycerides of soybean oil, sunflower oil, rapeseed oil, henspseed oil, sardine oil, cottonseed oil, and the like.

Another group of the epoxy-containing materials used in the process of the invention include the epoxidized esters of unsaturated monohydric alcohols and polycarboxylic acids, such as for example, diglycidyl phthalate, diglycidyl adipate, diglycidyl isophthalate, di(2,3-epoxy-butyl)adipate, di(2,3-epoxybutyl)oxalate, di(2,3-epoxyhexyl)succinate, di(3,4-epoxybutyl)maleate, di(2,3-epoxyoctyl)pimelate, di(2,3-epoxybutyl)phthalate, di(2,3-epoxyoctyl)tetrahydrophthalate, di(4,5-epoxydodecyl)maleate, di(2,3-epoxybutyl)terephthalate, di(2,3-epoxypentyl)thiodipropionate, di(5,6-epoxytetradecyl)-diphenyldicarboxylate, di(3,4-epoxyheptyl)sulfonyldibutyrate, tri(2,3-epoxybutyl)1,2,4-butanetricarboxylate, di-(5,6-epoxypentadecyl)tartrate, di(4,5-epoxytetradecyl)maleate, di(2,3-epoxybutyl)azelate, di(3,4-epoxybutyl)citrate, di(5,6-epoxyoctyl)cyclohexane-1,3-dicarboxylate, di(4,5-epoxyoctadecyl)malonate.

Another group of the epoxy-containing materials include those epoxidized esters of unsaturated alcohols and unsaturated carboxylic acids, such as glycidyl glycidate, 2,3-epoxybutyl 3,4-epoxypentanoate; 3,4-epoxy-hexyl, 3,4-epoxypentanoate; 3,4-epoxycyclohexyl 3,4-epoxycyclohexyl methyl epoxycyclohexane carboxylate.

Still another group of the epoxy-containing materials include epoxidized derivatives of polyethylenically unsaturated polycarboxylic acids, such as, for example, dimethyl 8,9,12,13-diepoxyeicosanedioate; dibutyl 7,8,11,12-diepoxyoctadecanedioate; dioctyl 10,11-diethyl-8,9,12,13-diepoxyeicosanedioate; dihexyl 6,7,10,11-diepoxyhexadecanedioate; didecyl 9-epoxyethyl-10,11-epoxyoctadecanedioate; dibutyl 3-butyl-3,4,5,6-diepoxycyclohexane-1,2-dicarboxylate; dicyclohexyl 3,4,5,6-diepoxycyclohexane-1,2-dicarboxylate; dibenzyl 1,2,4,5-diepoxycyclohexane-1,2-dicarboxylate and diethyl 5,6,10,11-diepoxyoctadecyl succinate.

Still another group comprises the epoxidized polyethylenically unsaturated hydrocarbons, such as epoxidized 2,2-bis(2-cyclohexenyl)propane, epoxidized vinyl cyclohexene and epoxidized dimer of cyclopentadiene.

The phenols used in the process of the invention are those compounds possessing more than one OH group attached to an aromatic nucleus. The phenols may be substituted with a great variety of different types of substituents. Examples of suitable phenols include, for example, resorcinol, pyrocatechol, hydroquinone, pyrogallol, hydroxyhydroquinone, phloroglucinol, 2,2-bis(4-hydroxyphenyl)propane, 2,2-bis(4-hydroxyphenyl)pentane, 2,2-bis(4-hydroxyphenol)phloroglucinol, 2,2-bis(4-hydroxyphenyl) propane, 2,2-bis(4-hydroxyphenyl)methane, 2,2-bis(3-allyl-4-hydroxyphenyl)propane, 2,2-bis(3-isobutyl-4-hydroxyphenyl)pentane, 1,1,2,2-tetrakis(4-hydroxyphenyl)ethane, 1,1,4,4-tetrakis-(4-hydroxyphenyl)pentane and the like, and polymeric type polyhydric phenols obtained by condensing monohydric or polyhydric phenols with formaldehyde as well as phenols of the formulae

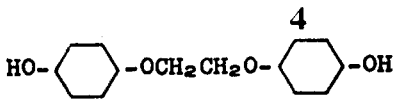

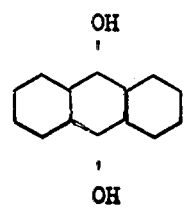

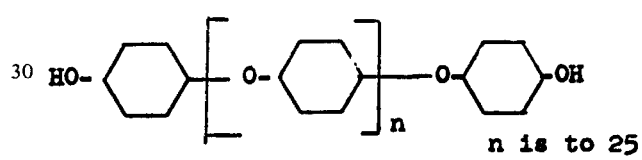

n is to 25

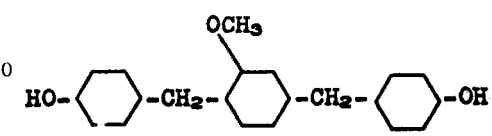

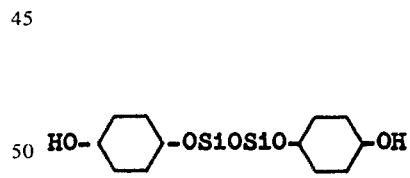

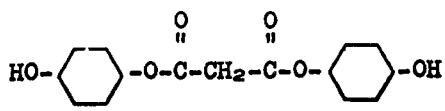

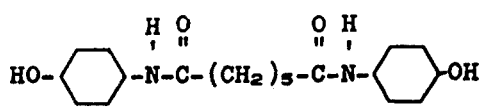

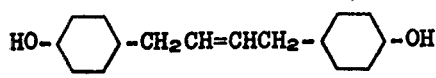

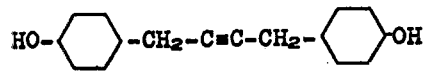

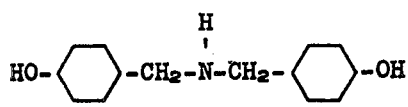

Preferred phenols to be used are the polyhydric phenols containing from 2 to 6 OH groups and up to 30 carbon atoms. Coming under special consideration are the phenols of the formula

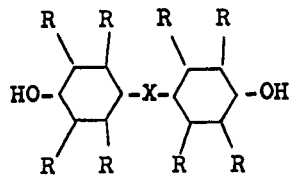

wherein X is a polyvalent element or radical and R is a member of the group consisting of hydrogen, halogen and hydrocarbon radicals. The preferred elements or radicals represented by X are oxygen, sulfur, —SO—, —SO$_2$—, bivalent hydrocarbon radicals containing up to 10 carbon atoms, and oxygen, sulfur and nitrogen-containing hydrocarbon radicals, such as —ORO—, —ORORO—, —S—R—S—, —S—R—S—R—S, —OSiO—, —OSiOSiO—,

and —SO$_2$—R—SO$_2$— radicals wherein R is a bivalent hydrocarbon radical.

One group of catalysts employed in the present invention are the phosphonium salts of an acid, ester, or acid ester of the element phosphorus which are represented by the general formula

wherein R$_1$, R$_2$, R$_3$ and R$_4$ are as defined in Formula I above wherein m is the valence of the anion X$_2$ and has a value from 1 to 3, and wherein X$_2$ may be represented by the general formulae

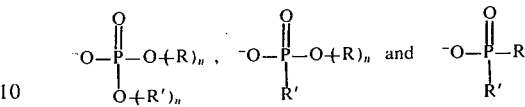

wherein each R and R' are independently selected from the same group as R$_1$, R$_2$, R$_3$ and R$_4$ above and wherein $n$ and $n_1$ independently have values equal to zero or 1.

Suitable such phosphonium salts of a phosphorus containing acid, ester or acid ester catalyst include, those having R$_1$, R$_2$, R$_3$, R$_4$, R$_5$, R and R' groups from 1–8 carbon atoms such as for example, ethyltriphenyl phosphonium diethylphosphate, di(ethyltriphenylphosphonium)ethylphosphate, tri(ethyltriphenylphosphonium)phosphate, methyltriphenylphosphonium dimethyl phosphate, methyltrioctylphosphonium dimethylphosphate, methyltriphenylphosphonium dimethyl phosphonate, ethyltriphenylphosphonium diphenylphosphinate and the like.

Another group of catalysts employed in the present invention and one which is generally preferred are the phosphonium salts of an acid, ester or acid ester of the element carbon which are represented by the formula

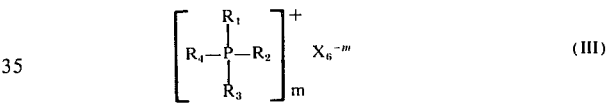

wherein R$_1$, R$_2$, R$_3$ and R$_4$ are as defined in Formula I, m is the valence of the anion X$_6$ and has a value of 1–2, and X$_6$ is represented by the formulae

wherein R and R' are independently selected from the same group as R$_1$, R$_2$, R$_3$ and R$_4$ as defined in Formula I and R can also be an alkenyl group having from about 1 to about 20 carbon atoms, and R' can also be an alkenyl group having from about 1 to about 20 carbon atoms, and R' can also be an alkenylene group having from about 1 to about 20 carbon atoms and n and n' have a value equal to zero or 1 and wherein y has a value of zero or 1.

Suitable such phosphonium salts of carbon-containing acid, ester or acid ester catalysts include those having R$_1$, R$_2$, R$_3$, R$_4$, R$_5$, R and R' groups from 1–8 carbon atoms such as, for example, ethyltriphenylphosphonium acetate, di(ethyltriphenylphosphonium)carbonate, ethyltriphenylphosphonium ethylcarbonate, ethyltriphenylphosphonium ethyloxalate, di(ethyltriphenylphosphonium)oxalate, phenyltributyl phosphonium acetate, chloroethyltriphenylphosphonium acetate, iodobutyltriphenylphosphonium acetate, bromopropyltriphenylphosphonium acetate, nitropentyltriphenylphosphonium acetate, and the like.

Suitable tetraalkylphosphonium catalysts include, for example, methyl tributyl phosphonium acetate, ethyl tributyl phosphonium acetate, propyl tributyl phosphonium acetate, tetrabutyl phosphonium acetate, tetramethyl phosphonium acetate, tetrapropyl phosphonium acetate, ethyl tricyclohexyl phosphonium acetate, methyltrioctyl phosphonium acetate, tetrabutyl phosphonium propionate, mixtures thereof and the like.

The phosphonium salts of a carboxylic acid employed as catalysts herein also include the acid salt complex of the catalysts. In these instances, the catalyst complex may be represented by the general formula

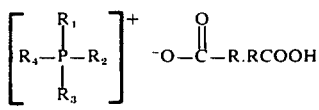

wherein R, $R_1$, $R_2$, $R_3$ and $R_4$ are as defined in Formula I.

The phosphonium catalysts employed in the present invention are commercially available compounds and general procedures and references for their preparation are given in Organo Phosphorus Compounds, by G. M. Kosolapoff, John Wiley & Sons, 1958 and in U.S. Pat. No. 3,341,580.

The general reaction conditions employed in the process of the present invention for reacting the epoxide with the phenol in the presence of a catalyst are well known and include temperatures in the range of from about 50° to about 300°C. at pressures ranging from about atmospheric to about 150 psig.

The amount of the epoxide and the phenol to be employed in the process may vary over a wide range depending upon the type of reactants and the type of product to be desired.

Particularly advantageous results are achieved by employing the process of this invention when the higher molecular weight resins are prepared and in this case the ratios of reactants are varied depending upon the molecular weight desired and upon the type of end groups desired, i.e., whether the product is to be terminated with an epoxide or with a phenol. These high molecular weight resins are particularly useful as industrial coatings and primers. The preparation of such higher molecular weight product is illustrated in the examples at the end of the specification.

The amount of the phosphonium catalyst employed in the process of this invention will vary over a wide range. In general, amount of catalyst will vary from about 0.001 percent to about 10 percent by weight, and preferably from about 0.05 percent to about 5 percent by weight of the reactants.

The reaction may be conducted in the presence or absence of solvents or diluents. In most cases, the reactants will be liquid and the reaction may be easily effected without the addition of solvents or diluents. However, in some cases, where either or both reactants are solids or viscous liquids it may be desirable to add diluents to assist in effecting the reaction. Examples of such materials include the inert liquids, e.g. ketones, inert hydrocarbons as xylene, toluene, cyclohexane and the like.

If solvents are employed in the reaction and the resulting product is to be used for coating purposes, the solvent may be retained in the reaction mixture. Otherwise, the solvent can be removed by any suitable method such as by distillation and the like. Unlike inorganic bases or amines, it is not necessary to remove the phosphonium catalysts from the reaction mixture prior to curing of the resin produced thereby.

The products obtained according to the above process of reacting an epoxide with a phenol in the presence of the defined phosphonium catalysts are phenolic hydroxy ether compounds. Their physical characteristics will depend upon the reactants and proportions employed. In general, the products will vary from liquids to solids, and in the case of the high molecular weight resins will vary from viscous liquids to hard solids. The products will possess an aliphatic OH group formed by each reaction of an epoxide and a phenolic OH group, and can be further reacted through this group if desired. The polyfunctional reactants will also give products terminated in phenolic OH groups and/or epoxy groups, and these will be available for further reaction.

A group of products which are particularly outstanding are those resins and polymers obtained by the reaction, in the presence of the catalysts herein defined, of the polyepoxides and polyhydric phenols in controlled proportions. Those which use an excess of the polyepoxide will be terminated in epoxy groups and can be used as polyepoxides in known reactions of polyepoxides with curing agents and the like. The high molecular weight polyepoxides are particularly useful in preparing surface coatings, adhesives, laminates, filament windings, coatings for highways and airfields, structural applications, formation of foams and the like. Those prepared from the halogenated polyhydric phenols as shown hereinafter are particularly useful as flame proofing resins for forming laminates, coatings and the like.

Precatalyzed epoxy resin compositions are of particular commercial interest. These precatalyzed systems are employed to prepare epoxy resins of higher molecular weight from low molecular weight resins by transporting epoxy resin compositions containing a catalyst for promoting the reaction between a vicinal epoxide group and a hydroxyl-containing compound to other locations where such precatalyzed compositions are reacted with a compound having about 2 hydroxyl groups to prepare epoxy resins of increased molecular weight. The catalysts employed in the process of this invention are particularly suited for this use.

The following examples are illustrative of the present invention and are not to be construed as limiting the scope thereof in any manner.

EXAMPLE 1

To a reaction vessel equipped with a means for stirring, temperature indication and control and nitrogen purge was charged 326.1 grams of the diglycidyl ether of 4,4'-isopropylidine diphenol (bisphenol A) having an epoxide equivalent weight (EEW) of 187, 169.0 grams of 4,4'-isopropylidinediphenol (bisphenol A), 4.9 grams of the hydrolyzed product of the diglycidyl ether of 4,4'-isopropylidine diphenol, and 0.606 grams of ethyltriphenyl phosphonium diethylphosphate (ETPP·DEP) dissolved in methanol. The reaction mass was heated at a rate of 5°C per minute. At a temperature of about 130°C, an exotherm began and when the temperature reached 150°C, the heating device was turned off. The exotherm peaked at about 246°C. After the exotherm had subsided, the temperature was maintained at 180°C for 5 hours.

9

The resultant product was a frangible solid which had properties as listed in Table I.

EXAMPLE 2

The reaction of Example 1 was repeated, except that 0.703 grams of methyltrioctylphosphonium dimethylphosphate (MTOP·DMP) was employed as the catalyst.

The exotherm peak occurred at 240°C.

The product was a frangible solid which had properties as listed in Table I.

EXAMPLE 3

The reaction of Example 1 was repeated except that 0.475 grams of ethyltriphenylphosphonium acetate, acetic acid complex (ETPP·AC·HAC) dissolved in methanol was employed as the catalyst.

The peak exotherm occurred at about 240°C.

The product was a frangible solid which had properties as listed in Table I.

EXAMPLE 4

The procedure of Example 1 was followed employing the following charge to the reaction vessel.
- 377.4 grams of the diglycidyl ether of bisphenol A having an EEW of 187,
- 5.7 grams of the hydrolysis product of the diglycidyl ether of bisphenol A,
- 116.9 grams of bisphenol A
- 0.694 gram ethyl triphenyl phosphonium diethylphosphate dissolved in methanol.

The exotherm peak occurred at about 230°C, after which the resin was heated at 160°C for about 4 hours.

The product was a frangible solid which had properties as listed in Table I.

EXAMPLE 5

Same procedure as in Example 4 except that the catalyst employed was 0.703 gram of ethyltriphenylphosphonium acetate, acetic acid complex (ETPP·Ac··HAc) dissolved in methanol.

The peak exotherm was about 230°C.

The product was a frangible solid which had the properties listed in Table I.

EXAMPLE 6

Same procedure as in Example 4 except that 0.703 gram methyltrioctylphosphonium dimethyl phosphate, (MTOP·DMP) dissolved in methanol, was employed as catalyst. The exotherm peak was about 230°C.

The product was a frangible solid which had the properties listed in Table I.

EXAMPLE 7

The procedure of Example 1 was followed employing the following charge to the reaction vessel.
- 346 grams of the diglycidyl ether of bisphenol A having an EEW of 187
- 148.4 grams bisphenol A
- 5.3 grams of the hydrolysis product of the diglycidyl ether of bisphenol A
- 0.352 gram of ethyltriphenylphosphonium diethylphosphate (ETPP·DEP) dissolved in methanol.

The exotherm peak was about 245°C and the resin was heated at 170°C for about 4 hours.

The product was a frangible solid which had the properties listed in Table I.

EXAMPLE 8

The procedure of Example 1 was followed employing the following charge to the reaction vessel.
- 320.2 grams of the diglycidyl ether of bisphenol A having an EEW of 187.
- 175.0 grams bisphenol A.
- 4.8 grams of the hydrolysis product of the diglycidyl ether of bisphenol A.
- 0.650 gram methyltrioctylphosphonium dimethylphosphate (MTOP·DMP).

The product was a frangible solid which had the properties listed in Table I.

TABLE I

| Product of Ex. No. | Catalyst | Gardner Color | % Epoxide of Product |
|---|---|---|---|
| 1 | ETPP.DEP | 1 | 2.71 |
| 2 | MTOP.DMP | 1 | 2.00 |
| 3 | ETPP.Ac.HAc | 1 | 2.35 |
| 4 | ETPP.DEP | 1 | 8.24 |
| 5 | ETPP.Ac.HAc | 1 | 8.15 |
| 6 | MTOP.DMP | 2 | 7.62 |
| 7 | ETPP.DEP | 1 | 4.39 |
| 8 | MTOP.DMP | 1 | 0.99 |

EXAMPLE 9

The reaction of Example 1 was repeated, except that the following charge was employed.
- 324.0 grams of the diglycidyl ether of bisphenol A having an EEW of 188
- 171.0 grams of bisphenol A
- 4.9 grams of the hydrolysis product of the diglycidyl ether of bisphenol A
- 0.48 gram ethyltriphenylphosphonium diphenyl phosphinate dissolved in methanol.

The peak exotherm was 225°C, after which the resin was heated at 180°C for 5 hours. The product was a frangible solid having an EEW of 231.0.

EXAMPLE 10

The reaction of Example 1 was repeated, except that the following charge was employed.
- 324.0 grams of the diglycidyl ether of bisphenol A having an EEW of 188
- 171.0 grams of bisphenol A
- 4.9 grams of the hydrolysis product of the diglycidyl ether of bisphenol A
- 0.375 gram of methyltriphenylphosphonium dimethylphosphonate dissolved in methanol The exotherm peak was 211°C, after which the resin was heated at 180°C. for 5 hours. The product was a frangible solid having an EEW of 2415.

EXAMPLE 11

A. To a reaction vessel equipped with a means for stirring, temperature control and indication, and nitrogen purge was charged 375.3 grams of the diglycidyl ether of 4,4'isopropylidine diphenol (bisphenol A) having an epoxide equivalent weight (EEW) of 183, 124.7 grams of bisphenol A, and 0.456 grams of ethyltriphenylphosphonium diethylphosphate (ETPP·DEP) dissolved in methanol. The reaction mass was heated at the rate of 5°C/minute. At a temperature of 130°C, an exotherm began and when the temperature reached 150°C, the heat was turned off. The exotherm peak was 228°C. After the exotherm subsided, the temperature was maintained at 160°C for 4 hours. The resultant product was a frangible solid having an EEW of 548.

B. The method of the above example was repeated except that the following charge was employed.
- 371.8 grams of the diglycidyl ether of bisphenol A (EEW = 183)
- 5.6 grams hydrolysis product of the diglycidyl ether of bisphenol A
- 122.6 grams of bisphenol A
- 0.456 grams ethyltriphenylphosphonium diethylphosphate dissolved in methanol.

After an exotherm peak of 226°C, the resin was heated at 160°C for 4 hours. The product was a frangible solid having an EEW of 547.

EXAMPLE 12

Stability Experiment

A precatalyzed mixture was prepared by blending the following:
- 100 parts by weight of a diglycidyl ether of bisphenol A
- 1.5 parts by weight of hydrolyzed diglycidyl ether of bisphenol A
- 0.1 parts by weight of the acetic acid complex of ethyltriphenyl phosphonium acetate.

The above precatalyzed mixture had a % epoxide of 21.76. This mixture was placed in a container and the container with contents were stored at 50°C for 4 weeks. After the 4 weeks storage, the percent epoxide was 21.55. The percent loss in percent epoxide was calculated as follows:

$$\frac{\% \text{ epoxide before storage} - \% \text{ epoxide after storage}}{\% \text{ epoxide before storage}} \times 100 = \% \text{ loss in \% epoxide}$$

$$\frac{21.76 - 21.55}{21.76} = \frac{0.21}{21.76} \times 100 = 0.965\% \text{ loss in \% epoxide}$$

The above experiment clearly indicates that the precatalyzed mixtures are stable at ordinary storage and transportation temperatures, i.e., 50°C or 122°F.

EXAMPLE 13

The procedure of Example 11 above was followed employing the following charge to the reaction vessel.
- 256 grams of diglycidyl ether of 4,4'-isopropylidine diphenol (EEW = 183)
- 64 grams of glycidyl ether of a novolac resin, (EEW - 178), i.e., and a functionality of 3.5, phenol-formaldehyde condensate
- 180.0 grams 2,6,2',6'-tetrabromo-4,4'-isopropylidine diphenol
- 0.64 gram of a 25 percent methanol solution of ethyltriphenylphosphonium diethylphosphate (0.16 gram of actual catalyst).

After 2 hours at 150°C, the mixture was cooled to 100°C and 125 grams acetone was added slowly through the condenser with thorough agitation until homogeneity was achieved. The resultant product was a viscous liquid having an EEW of 463 and a viscosity of 1160 centipoise at 25°C.

EXAMPLE 14

The process of the present invention is particularly useful in the preparation of higher molecular weight solid epoxy resins from lower molecular weight liquid epoxy resins by the pre-catalyzed method. In this method, the liquid epoxide resin is blended with the catalyst and oftentimes it is stored in warehouses where high temperatures are encountered for prolonged periods of time before being reacted with the diphenolic compound. The following two experiments demonstrate that a less colored product is obtained when the catalysts of the present invention are employed as compared to the phosphonium catalysts of the prior art.

A. A mixture containing 326.0 grams of the diglycidyl ether of bisphenol A having an EEW of 188, 4.8 grams of the hydrolysis product of the diglycidyl ether of bisphenol A, and 0.398 grams ethyl triphenyl phosphonium diethylphosphate was heat aged in an oven at 80°C for 7 days, after which time the resin was reacted with 169.0 grams of bisphenol A employing the procedure of Example 1. The peak exotherm was 242°C. The resultant product had an EEW of 2070 and a Gardner color of 1.

B. Comparative Experiment

A mixture containing 319.0 grams of the diglycidyl ether of bisphenol A having an EEW of 191, 4.8 grams of the hydrolysis product of the diglycidyl ether of bisphenol A and 0.972 grams of ethyltriphenylphosphonium iodide was heat aged in an oven at 80°C for 6 days, after which time the resin was reacted with 163.9 grams of bisphenol A employing the procedure of Example 1. The peak exotherm was about 235°C. The resultant product had an EEW of 2100 and a Gardner color of 4.

The above example clearly demonstrates the improved color of polyepoxides prepared from precatalyzed epoxy resin systems containing the catalysts of the present invention over those of the prior art.

EXAMPLE 15

The following example demonstrates the undesirable color formation when employing amine catalysts.

A. Comparative Example

Employing the procedure of Example 1, 374.9 grams of the diglycidyl ether of bisphenol A having an EEW of 189 was reacted with 119.5 grams of bisphenol A in the presence of 0.684 gram of benzyltrimethylammonium chloride as a 10 percent solution in methanol. After the exotherm, the reaction was maintained at 160°C for 4 hours. The product was a frangible solid which had a softening point of about 77°C, a Gardner color of 4 and a percent epoxide of 7.85.

B. Comparative Example

The reactants and procedures of A above was conducted in the presence of 0.375 grams of N-methylmorpholine as catalyst. The product was a frangible solid which had a melting point of about 78.5°C, a Gardner color of 3 and a percent epoxide of 7.78 percent.

EXAMPLE 16

The following experiments demonstrate that higher molecular weight resins can be prepared when a catalyst of the present invention is employed as compared to a phosphonium halide catalyst.

A. A high molecular weight thermoplastic polymer was prepared according to the process of this invention by charging 239.7 grams of diglycidyl ether of bisphenol A having an epoxide equivalent weight of 170.6 and 160.3 grams of recrystallized bisphenol A to a reaction vessel equipped as in Example 1. To this mixture, 71.0 grams of the monoethylether of ethyleneglycol was added as a diluent in order to facilitate stirring. After adding 0.959 grams of the acetic acid complex of ethyltriphenylphosphonium acetate dissolved in methanol, the reaction mixture was heated to 150°C at a rate of 5°C per minute. The reaction mass exothermed to a peak of 184°C. After the exotherm had subsided, the temperature was maintained at 140° - 150°C for about 2 hours. The heating means was removed and methylethyl ketone was added to the reaction mass until the non-volatiles content was 40 percent to facilitate handling. The resultant resin had a percent epoxide of 0.15 percent and a weight average molecular weight of 28,000 as determined by gel permeation chromatography.

B. Comparative Example

The procedure and charge of Example A above was employed except that the catalyst employed was 1.148 grams of ethyltriphenylphosphonium iodide. The exotherm peak was 173°C and the resin was heated for 4 hours before diluting to 40 percent non-volatiles with methylethyl ketone. The resultant resinous product had an epoxide content of 0.35 percent and a weight average molecular weight of 13,000 as determined by gel permeation chromatography.

EXAMPLE 17

The following examples demonstrate the ability of the phosphonium catalysts of the present invention to produce epoxy resins of improved molecular weight when compared to the corresponding phosphonium halide catalyst taught in U.S. Pat. No. 3,479,990.

EXPERIMENT A — Acetic Acid Complex of Ethyl Tripenyl Phosphonium Acetate

A high molecular weight thermoplastic polymer was prepared according to the process of the invention by charging 249.4 g. of the diglycidyl ether of bisphenol A having an expoxide equivalent weight of 189 and 150.6 g. of bisphenol A to a reaction vessel equipped as in Example 1 of the subject application. To this mixture, 44.5 g. of the mono-ethylether of ethylene glycol was added as a diluent to facilitate stirring. After adding 1.496 g. of the acetic acid complex of ethyl triphenyl phosphonium acetate dissolved in methanol, the reaction was heated to 150°C at the rate of 5°C/min. The reaction mass exothermed to 195°C. After the exotherm subsided, the temperature was maintained at 140° - 150°C for 4 hours. The heating means was removed and a mixture of methyl ethyl ketone and the monoethylether of ethylene glycol was added to the reaction mass until the mon-volatiles content was 40 percent and the solvent consisted of 50 percent methyl ethyl ketone and 50 percent mono-ethylether of ethylene glycol. The resultant resin had a percent epoxide of 0.32 percent and a weight average molecular weight of 22,000 as calculated from a gel permeation chromatogram.

EXPERIMENT B — Ethyl Triphenyl Phosphonium Acetate

The procedure and charge of Experiment A was employed except that the catalyst used was 1.27 g. of ethyl triphenyl phosphonium acetate. This amount of catalyst is equivalent in phosphonium content to that used in Experiment A. The exotherm peak was 196°C. The resulting resin had a percent epoxide of 0.33 percent and a weight average molecular weight of 20,000 as calculated from a gel permeation chromatogram.

EXPERIMENT C — Tetrabutyl Phosphonium Acetate-Acetic Acid Complex

The procedure and charge of Experiment A was followed except that the catalyst used was 1.380 g. tetrabutyl phosphonium acetate·acetic acid complex. This amount of catalyst is equivalent to that used in Experiment A. The exotherm peak was 188°C. The resulting resin had an epoxide content of 0.28 percent and a weight average weight of 22,000 as calculated from a gel permeation chromatogram.

COMPARATIVE EXPERIMENT D — Ethyl Triphenyl Phosphonium Iodide

The procedure and charge of Experiment A was employed except that the catalyst employed was 1.527 g. of ethyltriphenylphospshonium iodide. This amount of catalyst is equivalent in phosphonium content to that of Experiment A. The exotherm peak was 166°C and the resin was heated for 4 hours at 140° - 150°C before diluting to 40 percent non-volatiles with a mixture of methylethyl ketone and the mono-ethylether of ethylene glycol so that the final solvent composition was 50 percent methylethyl ketone and 50 percent of the monoethylether of ethylene glycol. The resultant resin had a percent epoxide of 0.52 percent and a weight average molecular weight of 12,000 as calculated from a gel permeation chromatogram.

COMPARATIVE EXPERIMENT E — Ethyl Triphenyl Phosphonium Chloride

The procedure and charge of Experiment A was employed except that the catalyst used was 1.20 g. of ethyl triphenyl phosphonium chloride. This amount of catalyst is equivalent in phosphonium content to that used in Experiment A. The exotherm peak was 190°C. The resulting resin had a percent epoxide of 0.41 percent and a weight average molecular wt. of 17,000 as calculated from a gel permeation chromatogram.

The above Experiments A, B, and C are representative of the present invention and demonstrate their superiority in their ability to produce high molecular weight resins over the catalysts of the prior art as represented by Comparative Experiments D and E.

EXAMPLE 18

A solid epoxy resin was prepared from the following reactor charge:
326.7 grams of a diglycidyl ether of bisphenol A having an epoxide equivalent weight of about 191.6
173.3 grams of bisphenol A
0.33 grams of ethyltriphenylphosphonium acetate·acetic acid complex.

The above ingredients were charged to a 1 liter, 3-necked glass reaction vessel equipped with stirring and temperature control means. The mixture was heated at the rate of about 5°C/minute, with stirring, to 150°C and then the heat was cut off. The reaction mass exothermed to about 245°C and was therafter allowed to cool to 180°C. This temperature was then maintained for about 5 hours. The resultant product had a Durran's softening point of 134.5°C, a Gardner viscosity (40 percent solution in the n-butyl ether of diethylene glycol) of $Z_2$-$Z_3$ and an epoxide equivalent weight of about 2040.

I claim:

1. In a process for preparing phenolic hydroxy ethers which comprises reacting a polyhydric phenol with a polyepoxide having more than one 1,2-epoxy group, the improvement comprising employing as the catalyst therefor, a phosphonium salt of an acid, ester or acid ester of the element carbon represented by the general formula

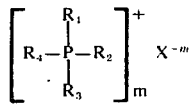

wherein $R_1$, $R_2$, $R_3$ and $R_4$ are independently selected from the group consisting of aliphatic hydrocarbon radicals containing from about 1 to about 20 carbon atoms, aromatic hydrocarbon radicals, alkyl substituted aromatic hydrocarbon radicals and radicals represented by the formula -$R_5$Y wherein $R_5$ is an aliphatic hydrocarbon radical having from about 1 to about 20 carbon atoms and Y is a member selected from the group consisting of Cl, Br, I, and $NO_2$, and wherein X is the anion portion of an acid, ester or acid ester of the element carbon and wherein m is the valence of the anion X.

2. The process of claim 1 wherein the catalyst is a phosphonium salt of an acid, ester or acid ester of the element carbon represented by general formula

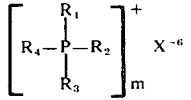

wherein $R_1$, $R_2$, $R_3$ and $R_4$ are as defined in claim 1, m is the valence of the anion $X_6$ and has a value of 1 to 2, and $X_6$ is selected from the group represented by the formula

wherein R and R' are independently selected from the same group as $R_1$, $R_2$, $R_3$ and $R_4$ and additionally R can be selected from an alkenyl group having from about 1 to about 20 carbon atoms and R' can be an alkenylene group having from about 1 to about 20 carbon atoms, y has a value of zero or 1 and wherein n and n' have a value of zero or 1.

3. The process of claim 2 wherein each $R_1$, $R_2$, $R_3$ and $R_4$ is independently an aliphatic or an aromatic hydrocarbon group.

4. The process of claim 3 wherein $X_6$ is selected from the group represented by the formula

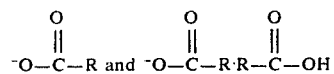

wherein R is an alkyl group containing from about 1 to about 20 carbon atoms.

5. The process of claim 4 wherein R is a methyl group.

6. The process of claim 5 wherein the catalyst is ethyltriphenylphosphonium acetate·acetic acid complex.

7. The process of claim 5 wherein the catalyst is ethyltriphenylphosphonium acetate.

8. The process of claim 4 wherein $R_1$, $R_2$, $R_3$ and $R_4$ are aliphatic hydrocarbon groups having from about 1 to about 20 carbon atoms.

9. The process of claim 8 wherein R is a methyl group.

10. The process of claim 9 wherein the catalyst is tetrabutylphosphonium acetate·acetic acid complex.

11. The process of claim 1 wherein the polyhydric phenol is a bisphenol and the polyepoxide is a diglycidyl ether of a bisphenol.

12. The process of claim 2 wherein the polyhydric phenol is a bisphenol and the polyepoxide is a diglycidyl ether of a bisphenol.

13. The process of claim 3 wherein the polyhydric phenol is a bisphenol and the polyepoxide is a diglycidyl ether of a bisphenol.

14. A precatalyzed epoxy resin composition comprising an epoxide resin containing an average of more than 1 vicinal epoxy group per molecule and a catalytic quantity of a catalyst as defined in claim 1.

15. A precatalyzed epoxy resin composition comprising an epoxide resin containing an average of more than 1 vicinal epoxy group per molecule and a catalytic quantity of a catalyst as defined in claim 2.

16. A precatalyzed epoxy resin composition comprising as epoxide resin containing an average of more than 1 vicinal epoxy group per molecule and a catalytic quantity of a catalyst as defined in claim 4.

17. A precatalyzed epoxy resin composition comprising an expoxide resin containing an average of more than 1 vicinal epoxy group per molecule and a catalytic quantity of a catalyst as defined in claim 10.

18. A precatalyzed epoxy resin composition comprising an epoxide resin containing an average of more than 1 vicinal epoxy group per molecule and a catalytic quantity of a catalyst as defined in claim 5.

19. A process for preparing high molecular weight resins which comprises reacting a polyepoxide having an epoxy equivalency greater than 1.0 with a polyhydric phenol in the presence of from about 0.001 percent to about 10 percent by weight of the reactants of a hydrocarbon phosphonium acetate-acetic acid complex of the general formula

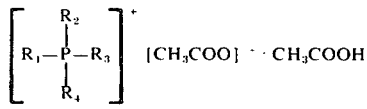

wherein $R_1$, $R_2$, $R_3$ and $R_4$ are the same or different and represent hydrocarbon radicals.

20. A process for preparing high molecular weight resins which comprises reacting a polyepoxide having an epoxy equivalency greater than 1.0 with a polyhydric phenol in the presence of from about 0.001 percent to about 10 percent by weight of the reactants of a hydrocarbon phosphonium acetate catalyst of the general formula

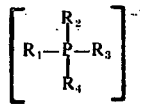 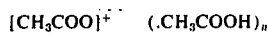

wherein $R_1$, $R_2$, $R_3$ and $R_4$ are the same or different and represent hydrocarbon radicals, and $n$ has a value of zero or one.

* * * * *